United States Patent [19]
Kenngott

[11] Patent Number: 5,136,770
[45] Date of Patent: Aug. 11, 1992

[54] CORNER MODULES AND ARTICULATE CONNECTORS FOR BALUSTRADE HANDRAIL CONSTRUCTIONS AND CONSTRUCTIONS INCORPORATING THE SAME, AND METHODS FOR PARTIAL FACTORY PRE-FABRICATION AND FOR ON-SITE FABRICATION AND INSTALLATION OF THE SAME

[76] Inventor: Hans Kenngott, Schollenhaldenstrasse 15, 7100 Heilbronn-Böckingen (Baden-Württemberg), Fed. Rep. of Germany

[21] Appl. No.: 107,828

[22] Filed: Oct. 13, 1987

[30] Foreign Application Priority Data

Oct. 14, 1986 [DE] Fed. Rep. of Germany ....... 3634901

[51] Int. Cl.⁵ .............................................. B04H 17/14
[52] U.S. Cl. .................................... 29/428; 29/525; 29/525.1; 52/185; 256/60; 256/65; 403/403
[58] Field of Search ............... 256/60, 65; 403/260, 403/403; 52/185, 726; 29/428, 525.1, 525

[56] References Cited

U.S. PATENT DOCUMENTS

| | | | |
|---|---|---|---|
| 2,800,305 | 7/1957 | Gerstner | 256/65 |
| 3,092,407 | 6/1963 | Blonder | 256/65 X |
| 3,323,819 | 6/1967 | Barker | 403/403 X |
| 3,484,827 | 12/1969 | Hall | 256/65 X |
| 3,804,374 | 4/1974 | Thom | 256/65 X |
| 3,991,982 | 11/1976 | Yamamoto | 256/65 |
| 4,508,320 | 4/1985 | Hegarty | 256/60 X |

FOREIGN PATENT DOCUMENTS

646594 12/1984 Sweden ................ 403/403

Primary Examiner—Joseph M. Gorski

[57] ABSTRACT

Corner modules have recessed, handrail-receiving mounting pockets bounded top and laterally by non-recessed boundary edge portions, but open at their bottom ends, and vertically taller than the end face of the handrail interval of steepest incline. The mounting pockets of the corner modules are factory-produced with very neatly made edges, whereas the end faces of handrail intervals are cut on-site for a particular installation, and tend to have cutting imperfections at the end face edges, such as chips, splinters, burring, edge waviness, etc. The handrail intervals, having underfaces with longitudinal slots, are mounted on baluster tops provided with articulate flanged connectors having tabs fitting firmly but slidably into the underface slots; thus the handrail intervals can be adjusted until they assume their needed relative positions, whereupon screws passing through holes in the flanged connectors penetrate the handrail underface deep within an underface slot. If re-positioning requiring new screw locations is necessary, the previous screwholes are hidden because located deep within such slots. Each corner module is pushed down from above into position on the ends of associated handrail intervals to be joined, its mounting pockets increasingly accepting and accommodating such ends, the non-recessed top and lateral boundary edge portions of the mounting pockets covering and hiding cutting imperfections at the end faces of the associated handrail intervals. If a particular corner module has a vertically measured excess of material at its bottom, the latter is severed before or after mounting of the corner module.

40 Claims, 4 Drawing Sheets

CORNER MODULES AND ARTICULATE CONNECTORS FOR BALUSTRADE HANDRAIL CONSTRUCTIONS AND CONSTRUCTIONS INCORPORATING THE SAME, AND METHODS FOR PARTIAL FACTORY PRE-FABRICATION AND FOR ON-SITE FABRICATION AND INSTALLATION OF THE SAME

BACKGROUND OF THE INVENTION

The invention concerns balustrades for staircases and the like, the balustrades being of the type including balusters provided at their upper ends with fastening elements so designed that they can mount a handrail interval and impart thereto an adjustable angle of handrail incline. Such balustrades furthermore include a handrail made up of a succession of handrail intervals that extend at angles to one another and have different respective inclinations. Each end of a handrail interval has a vertical end face. Means are provided in the region of each such vertical end face for joining the handrail interval to the next-following handrail interval.

Staircases generally require balustrades for the safety of persons using them. Staircases that have floor or inter-floor landings and change in direction and/or in angle of rise after such a landing require correspondingly configured handrails. There are many approaches to the problem of providing an easily assembled handrail construction that can be adapted to the differing angular directions and angles of inclination that successive handrail intervals are to exhibit in an arbitrary case. In general, however, each such known approach tends to be oriented, or is simply limited, to the use of one or more particular structural materials, whether metal, plastic, rope, or whatever. Handrails made of such materials present to the user's hand a subjective feel or grip very perceptibly differing from that of wood handrails. For a variety of reasons, many users of staircases and many builders strongly prefer handrails made of wood. Even the sight of a wooden handrail communicates a certain sense of familiarity and reliability, and the use of one during staircase ascent or descent gives the already mentioned and very characteristic wood-handrail feel that is so desirable. In very many instances today, the use of wood for handrails is economically feasible exclusively where straight handrail intervals are in question. Accordingly, staircases whose successive flights each extend in a different direction, such as long-L, narrow-U, and winder staircases, and likewise spiral and circular staircases, etc., are very often provided with handrails entirely constituted by a series of connected together, straight-extending handrail intervals. In those instances where one knows in advance, and with a high degree of precision and accuracy, the angular directions and angles of incline of the various straight intervals of a complex handrail, then in certain cases the handrail, or at least substantial parts of it, can be prefabricated at a factory, utilizing calculating, manufacturing, and assembling equipment, often under numerical or computer control. However, experience has proved that, in situations where the staircase must be fitted on site, in order to take into account dimensional tolerances of neighboring structural members, the handrail for the staircase must likewise be assembled, and to a considerable degree fabricated, on site.

In situations where a flight of steps that extends in a single direction has, e.g., an intermediate horizontal interval due to the presence of an intermediate or interstory landing, a corresponding and abrupt change of the inclination of the associated handrail, e.g., from a non-zero value to zero or vice versa, is readily achieved by one clean cut taken coincident with the bisector of the angle that is to be included between each two successive handrail intervals. However, experience shows that, when made on site, the cuts needed to implement the necessary changes of handrail direction and/or inclination inevitably exhibit various imperfections that can be quite problematic. These imperfections of cut may include, inter alia, chips and fractures at the edges of the cut end face of a handrail interval; burring along those edges; the presence of sometimes lengthy and deep-going surface splinters which extend to and are detached at the cut end face of the handrail interval and, at the ends of the splinters remote from the end face are still attached to the handrail stock but very tenuously; and so forth. These imperfections of cut are especially problematic if the successive handrail intervals are to be joined, one to the next, at their vertical end faces in face-to-face manner, and most especially when such joints are to exhibit sharp corners. Even the particular techniques developed for application to load-bearing stringers and stair carriages, but also applicable to handrails, that are disclosed in, e.g., Federal Republic of Germany "Gebrauchsmuster" DE-GM 71 73 304 and DE-GM 75 39 028 (the latter corresponding to published patent application, "Offenlegungsschrift", DE-OS 25 55 041) require very costly and exact manual work to form butt joints and seams that can be made to fit one another, with their formation requiring very clean cutting work.

In traditional staircase construction, it was of course customary to provide vertical handrail-supporting posts at the upper and lower ends of the stairway and at each landing, to support a handrail which would be of smoothly continuing character, no matter what the number of changes of handrail direction and inclination, and with the cross sections of the constituent handrail intervals being of whatever shape needed to achieve this. Clearly, the highly developed manual skills needed to accomplish such results are, nowadays, no longer available at reasonable cost.

Various attempts have been made to develop quick-assembly techniques in which handrails made of wood or wood-based materials are to be fitted onto successive staircase flights, where the successive flights necessitate handrail intervals of differing inclination, and in which the constituent handrail intervals are so far as possible prefabricated. Irrespective of whether such attempts at quick-assembly aspired to traditional, smoothly continuous handrail appearance, or to an appearance differing greatly therefrom, the fitting together of individual component elements on-site has been impossible to avoid, and with even the best of these attempts a certain degree of difficulty, requiring a certain degree of skill on the part of the joiners, has likewise been impossible to avoid. It will often happen that, earlier or later in the on-site assembly process, it is discovered that elements to be fitted together do not fit together because of already made assembly decisions or errors. Accordingly it is important that, when performing such on-site assembly of prefabricated elements, one be able to re-do sometimes substantial portions of already done assembly work without leaving behind visible traces of the original, unsuccessful attempts at assembly.

SUMMARY OF THE INVENTION

Generally stated, the invention aims to provide a handrail construction which presents a neat and workmanlike appearance even in instances where the cut end faces of successive handrail intervals do not exhibit clean cuts, and furthermore even when the assembly of the handrail intervals is performed in a relatively inexact fashion, e.g., by comparatively unskilled workers.

A related aim of the invention is to provide a handrail construction which, to the greatest possible extent, can be industrially prefabricated using factory equipment that readily produces clean cuts, perfectly planar surfaces, and so forth, of an exactness that cannot be accomplished on-site, with whatever on-site assembly work that remains necessary being performed easily and at low cost.

In the preferred embodiments of the invention illustrated and described herein, connecting and fastening means are provided at each location where the handrail is to undergo a change of direction and/or of inclination, this in general being at each location where one handrail interval is to be followed by another. Each such connecting and fastening means includes a corner piece, preferably made of solid wood with vertically oriented grain. The corner piece has a vertically extending side face, serving as a mounting face, for each of the at least two handrail intervals that are to meet, these vertical mounting faces standing at an angle relative to each other. The breadth of each mounting face is somewhat greater than the transversely measured thickness of the handrail intervals, which typically are of identical cross section. Furthermore, the corner piece has a vertical height somewhat greater than the vertical end face dimension of whichever handrail interval is to exhibit the greater inclination, a handrail interval of lesser inclination having end faces that are vertically shorter than a handrail interval of greater inclination. Each mounting face of the corner piece has a recessed mounting pocket whose breadth is substantially identical to the transversely measured thickness of the handrail intervals, so as to be able to receive the end of one. Each mounting pocket extends upward almost all the way to the top end, or top end face, of the corner piece but terminates somewhat short thereof, to thereby leave at the top end of the recessed mounting pocket a non-recessed top boundary edge portion. Laterally opposite, non-recessed, side boundary edge portions, each located to a respective side of the recessed mounting pocket, result from the fact that the breadth of the mounting face, as already mentioned, is somewhat greater than the transversely measured thickness of the handrail intervals. The recessed mounting pocket, although not extending all the way up to the top end of the corner piece, does extend all the way to the bottom end of the corner piece, so that the mounting pocket not have a similar, non-recessed, bottom boundary edge portion. In this way, the cut end face of a handrail interval can be inserted into the recessed mounting pocket by vertically downward movement of the corner piece relative to the handrail interval end. Imperfections of cut exhibited by the end face of the thus inserted handrail interval end, such as chips and burring at the end-face edges, imperfect planarity of the end face itself, etc., are hidden over by the non-recessed top and side boundary edge portions of the mounting pocket. Similarly, if the handrail end exhibits tenuously attached lengthwise extending surface splinters that have already become detached at the region of the handrail end, the top and/or one of the side boundary edge portions of the recessed mounting pocket can furthermore serve to confine the detached end of the surface splinter and prevent it from detaching. The end face of the inserted handrail interval end is fastened to the recessed main surface of the mounting pocket directly, e.g., by means of threaded connector(s) passing through the material of both the corner piece and of the handrail interval end, or else indirectly, e.g., employing some type of intermediate connector that is securely fastened to the recessed main surface of the mounting pocket and also to the end face of the inserted handrail interval end but with such main surface and end face not being per se directly fastened to each other.

The invention proceeds from the recognition that, when manual laborers of average skill or even professional joiners work with handrail constructions of relevant quick-assembly types, there will occur at least small angular errors and likewise cut-edge imperfections, the latter especially in the case of handrail intervals not made of very high quality hardwood. As already stated, the invention provides a very simple corner piece which no longer allows such errors and imperfections to remain visible after handrail assembly, these instead being hidden by the non-recessed top and side boundary edge portions of the recessed mounting pockets. Furthermore, it will be clear that the fundamental principle of this novel corner piece can be realized in a very great variety of configurations. It is to be understood, however, that what is here involved is considerably more than another form of end or cover cap such as used for many decorative or cosmetic purposes in construction technology; among other things, it will be clear that the corner piece in question is, to begin with, not a decorative cap but a structural element. Thus, what is here involved is a corner piece which combines in itself the abilities to serve in three important roles: (a) as a structural element; (b) a structural element that, certainly, does hide the fabrication errors and cut in question and, yet further, (c) an imperfection-hiding structural element whose basic principle of configuration provides a way to take into account the different vertical dimensions of the end faces of differently inclined handrail intervals. The last-mentioned function is accomplished by configuring the corner piece to have, as earlier stated, a vertical height somewhat greater than the vertical end-face dimension of whichever handrail interval is to exhibit the greater inclination or, yet more generally said, to have a vertical height somewhat greater than the vertical end-face dimension of the most steeply inclined handrail interval that can reasonably be expected in the construction of staircase balustrades. After insertion of the ends of the (at least two) handrail intervals into the (at least two) recessed mounting pockets of the corner piece, and after the fastening of the ends in the mounting pockets, any downwardly extending excess in the vertical dimension of the corner piece can be removed by simply sawing it off, and only if really necessary then doing a small amount of sanding or grinding work to smooth off the edges and/or conceivably the just cut bottom face itself.

With the inventive corner piece it is no longer necessary that the installer or joiner machine out, on site, a handrail-end-accommodating recess in any way equivalent to the aforementioned mounting pocket. Likewise, it is not necessary to stock, for each handrail breadth, a multitude of corner pieces having mounting recesses of a multitude of lengths just to accommodate the differently tall handrail interval end faces that develop as a result of differing handrail inclinations on different jobs. On the contrary, corner pieces embodying the invention can be economically manufactured in large quantities and virtually always be usable, no matter how various the inclinations of the constituent handrail intervals of the handrail required for a particular case.

The already mentioned non-recessed top and side edge portions bounding the mounting pocket can be very neatly produced at the factory, by forming the recessed mounting pocket using high-precision and/or numerically controlled machining equipment. This assures that, in the assembled handrail, the highly visible quality of fit at the tops and sides of the end of each handrail interval will appear of superb workmanship. The absence of corresponding, non-recessed, imperfection-hiding edge portion structure at the bottom end of the mounting pocket of the corner piece is, in contrast, almost always of little or no significance. To be able to see, i.e., at all see, the bottom surface of the corner piece, a person must be located not merely with his eye level lower than such bottom surface but, in addition, the eyes of such person must be almost directly below the bottom surface of the corner piece and, finally, such person must for some reason be gazing upward. Even if it should actually happen that a person is standing in exactly such a position, and gazing upward, it will often be the case that the bottom surface of the corner piece is a considerable distance above eye level, and thus too high for such person to be able to clearly, if at all, see imperfections such as discussed above and/or perceive the absence of a non-recessed bottom edge portion for the mounting pocket. Indeed, even if the fact of such absence is actually perceived, it will often be the case that the viewer does not take this to be in any way a disagreeable or less than first-class aspect of design.

The invention is particularly suited for solid wood handrails and corner pieces. However, for ecological as well as economic reasons, the use of rare woods such as can be left with a natural finish is necessarily to be limited. As it happens, the principles of the invention are equally applicable to a considerable variety of materials other than wood, because one continues to encounter the problem of producing perfectly cut end faces on the handrail intervals, the problem of somehow hiding the inevitable imperfections of such cuts, and the problem of combining handrail intervals of differing inclination and therefore differing end-face height. Accordingly, the invention can be implemented without substantial modification in a variety of structural and decorative materials, e.g., veneered wood-core stock, thickly lacquered wood stock, and even profiled metallic and plastic stock. As to the corner pieces themselves, these can be made of solid wood at reasonable cost because only relatively small workpieces are needed. With these, the mounting pockets can be formed using wood milling machines with suitable milling attachments. Alternatively, if using metals or plastics for the corner pieces, these can be formed as cast or molded bodies and, in the case of metals, non-ferrous metals are of course preferred. Casting and molding readily produce corner pieces of the desired configuration. As a favored example, corner pieces made of cast brass or bronze make for a particularly attractive effect when combined with handrail intervals of dark natural finish wood or wood veneer. The recessed mounting pockets of the inventive corner pieces are of especial advantage in the case of handrail intervals that are veneered or thickly lacquered, because the non-recessed top and side boundary edge portions serve not merely to hide end face imperfections such as discussed above, but also to firmly hold in place the layer of veneer or lacquer at the end of the handrail interval, so that such layer not commence to peel off, starting as usual from an end, over the course of time.

In the preferred embodiments depicted and described herein, each corner piece has two vertical mounting faces provided with recessed mounting pockets whose recessed major surfaces are planar, vertical and perpendicular to each other. In principle, however, it is not necessary that the corner piece be of generally rectangular, nor even quadrilateral, horizontal cross section. Nor is it in principle necessary that the recessed major surfaces of the mounting pockets be planar, especially if one employs intermediate fasteners such as depicted herein and described further below.

However, it is in fact presently preferred that the corner pieces be vertical, somewhat columnar elements of four-sided geometry, with two planar, vertical, mutually perpendicular mounting faces, and the major surfaces of their respective recessed mounting pockets being likewise planar, vertical and mutually perpendicular. In the shown embodiments the other two (non-mounting) side faces of each corner piece neighbor each other along a vertical edge region that has been transversely rounded off with a considerable corner radius. A corner piece of this geometry is readily manufactured, fulfills the requirements of most balustrades that are to have handrails made of wood or wood-based materials, makes a visually agreeable impression, and provides the staircase user with the familiar and comfortable "feel" when grasping the handrail.

The novel features which are considered as characteristic for the invention are set forth in particular in the appended claims. The invention itself, however, both as to its construction and its method of production and assembly, will be best understood from the following description of preferred embodiments when read in conjunction with the accompanying Figures.

DESCRIPTION OF THE PREFERRED EMBODIMENTS

Figures 1, 1A:
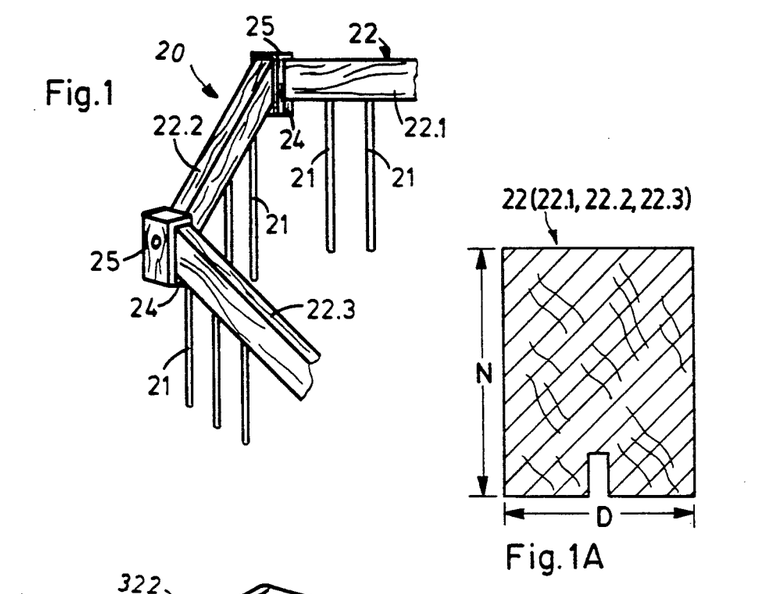
FIG. 1 is a schematic perspective view of a balustrade provided with a handrail having two corners, namely where the handrail intervals undergo a change of direction or a change of inclination.
FIG. 1A shows the cross-sectional shape of the handrail intervals 22.1, 22.2 22.3 of FIG. 1, taken at a sectioning plane oriented normal to the direction of elongation of the respective handrail interval 22.1, 22.2 or 22.3, the shown sectional plane being on the same scale employed in FIGS. 3 and 4 below.

The balustrade 20 shown in FIG. 1 includes balusters 21 and a handrail 22. Handrail 22 is made up of handrail intervals 22.1, 22 2 and 22.3 formed from straight solid wood and fastened to the mutually perpendicular mounting faces 24 of a corner piece 25 having, in all, four vertical side faces. The three shown straight handrail intervals extend at differing angles of inclination and in three different vertical planes and are joined one to the next by means of corner pieces 25. The entire handrail 22 can in principle, in fully assembled self-supporting condition, be secured onto the balusters 21, and no further connections to the stairs and/or adjoining walls need be manufactured or installed. Such handrails can advantageously be provided for quick-mounting balusters which are secured upright on the steps of the stairway prior to provision of the handrail construction and which are provided with suitable means for implementing adjustment of their length, i.e., height, and for fixedly securing them on the respective stairs at the adjusted length or height. In this way one can obtain a complete quick-assembly balustrade system, employing straight handrail intervals of rigid stock, capable of realization with the herein preferred material, namely solid wood, and with all fabrication and assembly work that need be done on-site being within the capabilities of even semi-skilled workers.

Figure 2:
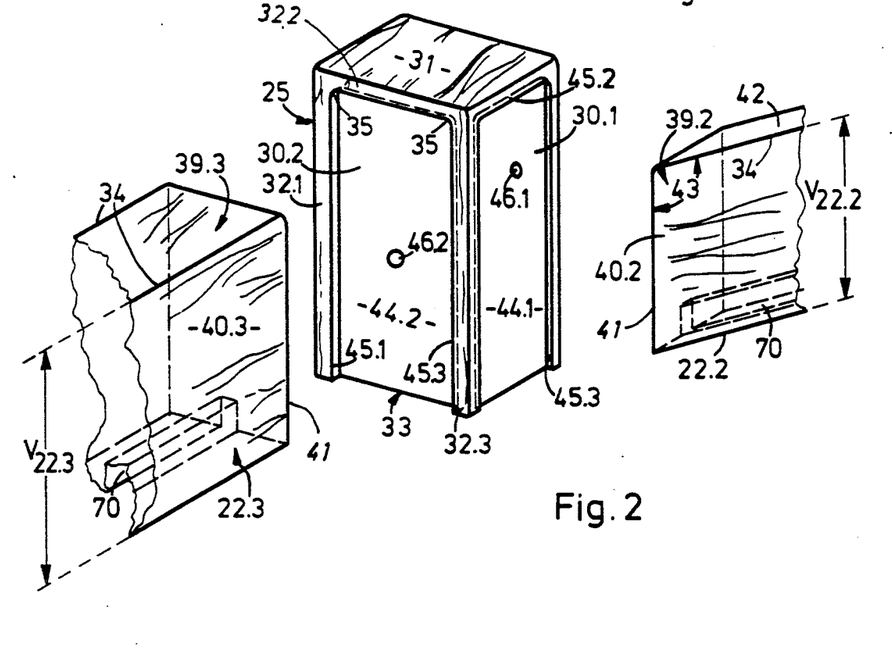
FIG. 2 is an exploded perspective view of the elements present at a handrail corner joint, namely two handrail intervals and a corner piece.
Figure 3:
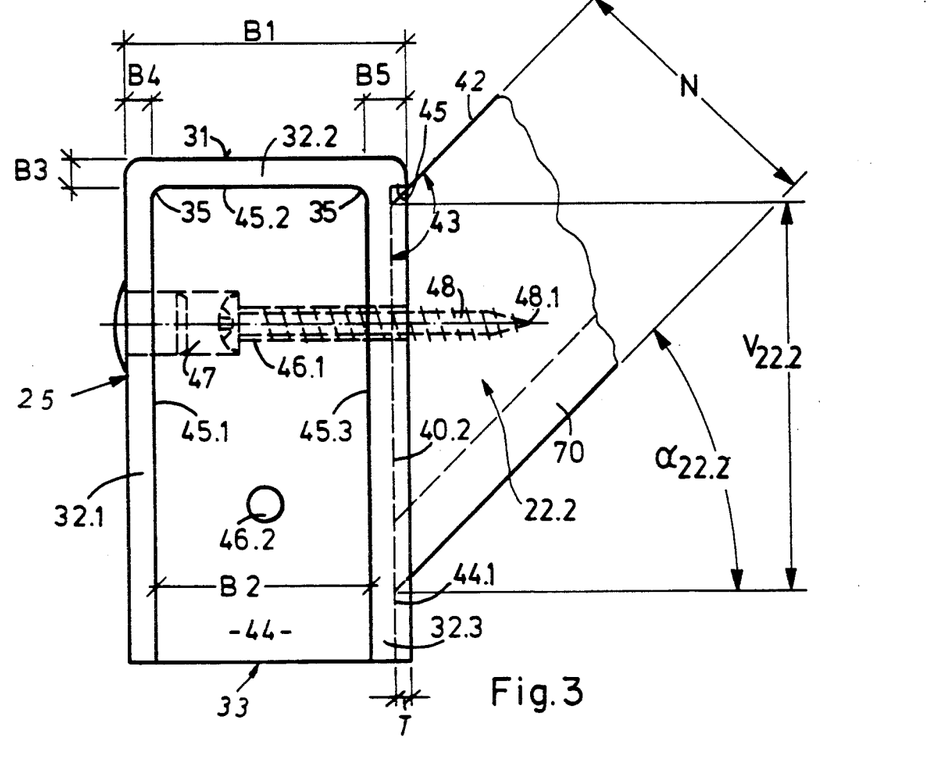
FIG. 3 is a side elevational view of the corner piece shown in FIG. 2, with one of the two handrail intervals shown mounted in place, but with the other handrail interval absent, so that the one of the two corner piece mounting pockets that is parallel to the picture plane be directly visible.
Figure 4:
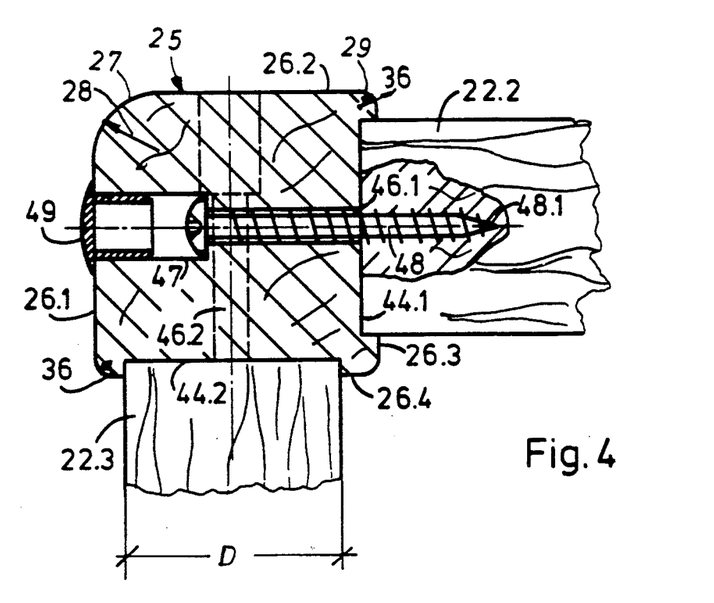
FIG. 4 is a horizontal section through the corner piece and two handrail intervals of FIG. 2, with one handrail interval being mounted fastened and the other positioned but not yet mounted and fastened.

One rectangular corner piece 25 is to be seen in detail in FIGS. 2-4. Two free (non-mounting) side faces 26.1 and 26.2 (FIG. 4) stand at right angles to each other and adjoin each other via a rounded off outer vertical corner 27 of considerable radius 28. Diagonally opposite rounded vertical corner portions 36 (FIG. 4) respectively constitute transitions from free side face 26.1 to mounting face 26.4, and from free side face 26.2 to mounting face 26.3, these transitional corner portions 36 each having a radius 36 substantially smaller than the radius 28 of the outer vertical corner 27. Respective ones of four further but horizontally extending rounded-off corner edge portions constitute transitions from the horizontal top face 31 of the corner piece 25 to the free vertical side faces 26.1 and 26.2 of corner piece, and to its vertical mounting faces 26.3 and 26.4, these four further corner edge portions being of a corner radius considerably smaller than radius 28. The corner piece 25 is a solid one-piece structural element fabricated from wood, with the cuts that define the planes of corner piece 25 having been made such that its grain extends vertically.

The vertical side faces 26.3 and 26.4 of the corner piece, in order to serve as mounting faces, are machined, e.g., milled, to have recessed mounting pockets 30.1 and 30.2 (FIG. 2) whose major surface are, in this embodiment, vertical planar mounting surfaces 44.1 and 44.2. Each handrail-mounting pocket 26.3 or 26.4 is bounded at its top and at its two sides by remaining, non-recessed boundary edge portions of the respective mounting face 26.3 or 26.4, namely the outward vertical boundary edge portion 32.1, top boundary edge portion 32.2, and the inward vertical boundary edge portion 32.3. These three reference numerals appear in FIG. 2, applied to the edge portions bounding the mounting pocket 30.2 but, when referred to below, will be understood likewise to apply to the edge portions bounding the other mounting pocket 30.1; i.e., the outward vertical boundary edge portions 32.1 of the two recesses 30.1, 30.2 are the two that diagonally oppose each other, whereas the inward vertical boundary edge portions 32.3 are the two that adjoin each other at the innermost vertical edge region of corner piece 25. The existence of the top boundary edge portions 32.2, which adjoin the planar, horizontal top face 31 of the corner piece 25 and bound the upper ends of mounting pockets 30.1 and 30.2, results from the fact that the mounting pockets do not extend upward all the way to the top face 31 of the corner piece 25 but instead terminate a small distance therebelow. In contrast, at the bottom end 33 of corner piece 25, the mounting pockets 30.1 and 30.2 are unbounded and downwardly open, as can likewise be clearly seen in FIG. 2. The horizontal dimension B1 (FIG. 3) of each of the four vertical faces of corner piece 25 is for example 50–55 mm, preferably 53 mm, whereas the horizontal dimension B2 of each mounting pocket 30.1 and 30.2 corresponds exactly to the horizontally measured thickness D (FIG. 4) of the handrail intervals 22 and can amount to for example 38 mm. The top longitudinally extending edge portions 34 (FIG. 2) of each handrail interval 22 are transversely rounded off with a radius corresponding to the boundary radius 35 at the two top corners of each mounting pocket 30.1 and 30.2. The depth T (FIG. 3) of each mounting pocket 30.1 and 30.2 can for example be 2.5 mm, but this depth T can be of greater value as appropriate. The vertically measured breadth B3 (FIG. 3) of the non-recessed top boundary edge portion 32.2 of each of mounting pocket 30.1, 30.2 can for example be 6.5 mm. The horizontally measured breadth B4 of each of the two diagonally opposite, outward, non-recessed, side boundary edge portions 32.1 can for example be 5–6 mm, whereas the horizontally measured breadth B5 of the two inward, directly adjoining, non-recessed boundary edge portions 32.3 can for example be about 6–10 mm. Thus, the non-recessed boundary edge portions, especially the side boundary edge portions 32.1, 32.3, bounding the mounting pockets 30.1 and 30.2 can, according to the requirements of a particular situation, be of differing breadths, with B4 typically being as here smaller than B5. This serves two purposes. First, it will frequently happen that the user, in ascending or descending the staircase, will do no more than lightly glide his or her hand along the top face of the handrail. However, it also frequently happens that a user, if e.g. infirm or tired, will instead very tightly grasp approximately the upper half of the handrail and even lean against it or away from it while walking the staircase, in order to steady himself or herself against falling. A yet more extreme but quite common occurrence during staircase ascent is for the user to powerfully grasp, with forwardly outstretched arm, the upper half of the handrail and then hoist himself or herself up the several corresponding steps, and to then repeat this process for the next several steps, etc. In these various instances, the handrail may be subjected to a substantial lateral load, or to a rotational or twisting load that includes a lateral vector component. The greater the horizontally measured breadth B4 or B5, usually B5, the greater is the bulk of transverse-load-resisting material in the side boundary edge portion 32.1 or 32.2 available to withstand such laterally applied load. It will usually be the breadth B5 that is greater, not only on account of which breadth need be greater in the sense of mechanics, but more important due to the fact that transverse loads, or transverse components of loads, exerted upon the handrail in the direction toward it are associated with outward balustrade collapse and the possibility of falling from a perhaps considerable height straight down off the staircase, whereas lateral loads exerted upon the handrail in the direction away from it are, in contrast, associated with inward balustrade collapse, an occurrence whose possibility is by comparison much less frightening to users. Therefore, even where the balustrade has been designed so strong that, no matter what the circumstances, there is no possibility whatever of either inward or outward balustrade collapse, it is nevertheless of great importance for the user's peace of mind that the handrail give the user a subjective feeling of extreme strength and extreme reliability against lateral balustrade collapse, especially outward collapse. In this respect, and also for reasons of actual mechanical ability to withstand loads and avoid outward balustrade collapse, the longer a particular handrail interval is to be, the greater may become the values necessary for the transversely measured breadths B4 and B5 and likewise the amount by which B5 exceeds B4. There is a second and quite different reason why B5 may generally need to exceed B4. It can be that sufficiently great values for either one, or both, of B4 and B5 will be quite effective to impart the requisite stability. Nevertheless, the user, when ascending or descending the staircase usually comes most sensibly into contact with the diagonally opposed vertical edge portions 32.1 of the corner member 25, at the balustrade-facing side of the user's body. For that reason it is desirable that B4 so far as possible be less than B5, in order to present the smallest possible inwardly transverse protrusion, relative to the inward flank of the handrail 22. It is for this reason, likewise, that the even more exposed vertical edge portion 27 of the corner piece 25 is so expansively rounded.

The ends 39.2 and 39.3 (FIG. 2) of the handrail intervals 22.2 and 22.3 have end faces 40.2 and 40.3. These are formed at the installation site itself, after the handrail intervals have been fastened to the balusters 21, by sawing off the excess end length of each handrail interval. After doing this, there will nearly always be found at the end-face edges 41 of each handrail interval various imperfections of cut, whether edge chips, tenuously attached longitudinal splinters, burrs, waviness in the cut edges, deviations of the cut end faces from exactly the vertical planes they are intended to be, and the like. Which of these imperfections will occur depends upon the particular material used for the handrail, the particular sawing or cutting tool employed, and the skill of the worker. Even more problematic is the fact that the vertical dimension of the one handrail-interval end face 40.2 will often be different from that of the other 40.3, depending upon the differing zero or non-zero inclinations which the two handrail intervals 22.2 and 22.3 are to exhibit. The nature of this problem, generally will be clear from the Figures. The three handrail intervals 22.1, 22.2, 22.3 of e.g. FIG. 1 are, typically, merely severed increments of a particular handrail stock, thus all having an identical cross-sectional shape. FIG. 1A is a cross-section through the particular handrail stock employed in the present embodiment, such that the direction of elongation of the employed handrail stock is normal to the FIG. 1A sectioning plane. (FIG. 1A is drawn to the same scale employed for FIGS. 3 and 4.) Within a nominally-oriented sectioning plane, such as used for FIG. 1A, each handrail integral 22.1, 22.2, 22.3 has a transverse breadth D (see also FIG. 4) and also a certain height N (see also FIG. 3). As can be seen in FIG. 3, the end face 40.2 of the shown handrail interval 22.2 has a vertical dimension $V_{22.2}$ which is noticeably greater than N. Vertical dimension $V_{22.2}$ is grater than N because handrail interval 22.2 extends inclined at a non-zero value of angle $alpha_{22.2}$ to the horizontal direction. Generally, for all three handrail intervals 22.1, 22.2 and 22.3, the end face vertical dimension $V_{22.n}$ exceeds the aforementioned value N by an amount that is greater for larger values of $alpha_{22.n}$ and smaller for smaller values of $alpha_{22.n}$, with the value of $V_{22.n}$ becoming equal to the value of N when the value of $alpha_{22.n}$ is zero. For example, as can be seen in FIG. 2, the vertical dimension $V_{22.3}$ of the end face 40.3 of handrail interval 22.3 is somewhat greater than the end face vertical dimension $V_{22.2}$ of handrail interval 22.2, this corresponding to a somewhat steeper incline for handrail interval 22.3 than for handrail interval 22.2. In general, the angles of incline for successive handrail intervals, and thus the vertical dimensions of their respective end faces, are thus non-inversal but instead job-determined. Accordingly, the creation of a corner module 25 exhibit some considerable degree of universality despite indeterminate values of $V_{22.n}$ presents various potential difficulties. The present embodiment takes these various potential difficulties into account by having the attachment recesses 30.1, 30.2 of the prefabricated corner piece 25 be downwardly open. In this way, after the length excess of the two handrail intervals to be joined by a particular corner piece 25 has been removed, the corner piece 25 can be pushed down from above, with the downwardly open mounting pockets 30.1, 30.2 accepting and accommodating an increasing fraction of the two ends of the two handrail sections 22.2, 22.3 during such downward pushing. This manner of bringing the corner piece 25 into proper position on the ends of the handrail intervals is quite advantageous. If for example, the sawn-off end faces 40.2, 40.3 of the handrail intervals had to be longitudinally inserted into mounting recesses each bounded on four sides, not three, by non-recessed top, bottom, and side boundary edge portions, then burrs and tenuously attached lengthwise end splinters would make such longitudinal insertion quite difficult. Indeed, the very act of longitudinal insertion would tend to cause the burrs to flare out, become thus more unsightly, and become a greater obstacle to longitudinal insertion; and tenuously attached longitudinal end splinters, especially if lengthy, would almost certainly break off, leaving long and conspicuous chips in the spaces they had occupied at the outer surface of the handrail. However, because the prefabricated corner piece 25 of the shown embodiment has mounting pockets 30.1, 30.2 which are unbounded and entirely open at their bottom ends, so that the corner piece can be pushed down into proper position from above, the problems just mentioned can be greatly alleviated, and often be overcome in their entirety. Outwardly flaring burrs at the edges of the sawn-off end faces 40.2, 40.3 are not subjected to any action tending to increase the degree to which they outwardly flare; instead, they tend if anything to be pushed or "folded" downward into parallelism with the side faces of the handrail interval, and thus be to a certain degree smoothed down or compressed back into the end grain or volume-defining envelope of the handrail interval. If longitudinal splinters tenuously attached to the end portions of the handrail intervals are present, these can manually or by other equivalent means be held tight within the surface envelope of the handrail surface, in order not to laterally project and be exposed during the pushing down of the corner piece 25 into place. Indeed, after the corner piece 25 has been pushed down into proper position, the splinter-neighboring side and/or top boundary edge portion 32.1 and/or 32.2 and/or 32.3, as the case may be, serves forcibly to laterally and/or downwardly confine and retain the lengthwise splinter, so that it be no longer free to break off. It will often be the case that the top or side edges 41 of the sawn-off end face 40.2 or 40.3 exhibits waviness, and/or that the sawn end face 40.2 or 40.3 itself exhibit waviness, and/or that the end face cut has been made imperfectly with the end face not occupying a perfectly vertical plane or else being perfectly vertical but transversely skew, i.e., not forming identical angles with both side faces of the handrail interval. Here again, the effect of the listed imperfections, and of others of the same sort, can be greatly alleviated, or entirely overcome, due to the fact that the inventive prefabricated corner piece 25 has mounting pockets 30.1, 30.2 which are downwardly open, so that the corner piece can be pushed down into proper position from above. Specifically, if these deviations from what is intended are of a dimension, considered longitudinally of the handrail interval, less than the depth T (FIG. 3) of the associated mounting pocket 30.1 or 30.2, the three pocket-bounding edge portions 32.1, 32.2, 32.3 will simply hide the existence of such imperfections. However, for an acceptably neat appearance, it is necessary that the sawing or cutting off of the length excess of the handrail interval, i.e., to form the end face 40.2 or 40.3 thereof, and likewise the mounting of the handrail interval in the mounting pocket 30.1 or 30.2 of the corner piece 25, be performed in such a manner that, at the least, the top face 42 of the inserted handrail interval fit neat, tight and flat against the visible top boundary edge portion 45.2 of the mounting pocket, to form a joint of workmanlike appearance. Finally, as already mentioned, the vertical dimension of the end face 40.2 or 40.3 (FIG. 2) of a particular handrail interval will be greater or less, depending upon the angle of incline that the handrail interval is to have. In order that the inventive, prefabricated corner piece 25 be of general applicability to this variable, the corner piece 25 will typically be provided with a considerable vertical dimension, such as to be predictably in excess of what will be required. This assures the corner piece will be sufficiently tall, even in the case where the handrail intervals to be secured thereto are to exhibit a great incline and have correspondingly tall end faces. To the extent that the vertical dimension of the corner piece 25 is greater than required, the vertical excess will be present at its bottom end, where it can be removed, e.g. by simple sawing.

In this exemplary embodiment, two mutually perpendicular countersunk throughbores 46.1 and 46.2 (FIG. 4), having initial enlarged-diameter screwhead-accommodating intervals 47, extend horizontally through the corner piece 25, each passing perpendicular through two opposed vertical side faces 26.1 and 26.3, or 26.2 and 26.4, of the corner piece at different respective vertical heights (see FIG. 3). The vertical height of first throughbore 46.1 is such that end 48.1 of the shown, inserted, first fastening screw 48 penetrates into the vertical end face of handrail section 22.2 at a location whose vertical spacing from both the top and bottom edges of the handrail end face is sufficient to assure that screw end 48.1 will not emerge out from either the top or bottom face of the handrail interval 22.2. Entirely analogous remarks apply to the (not shown) second fastening screw inserted through second countersunk throughbore 46.2.

As already discussed, the side boundary edge portions 32.1, 32.3 and top boundary edge portion 32.2 of each mounting pocket 30.1, 30.2 are able to withstand loads exerted transverse to the elongation of the respective handrail interval 22.2 or 22.3. Accordingly, a single fastening screw is sufficient to secure the end face of each of the handrail intervals to the associated mounting face of the corner piece 25. Plastic or wood closure plugs having caps 49 (FIG. 4) can be inserted into the initial intervals of each countersunk throughbore with the caps 49 protruding slightly as shown, or else being flush with the respective non-mounting side face.

The components involved in the corner connection are simple and readily manufactured, the corner connection constitutes an attractive feature suitable for a variety of color or natural wood finishes, and the corner connection is capable of quick and clean implementation at the installation site, it merely being necessary, as already said, that any bottom excess be sawn off the corner piece upon installation. It may sometimes be desired that the adjoining handrail intervals meet at their corner juncture at other than a right angle. In such event, the corner piece 25 can be of a configuration other than that of a rectangular prism, with the major surfaces 44.1 and 44.2 of the mounting pockets not being perpendicular to each other. Likewise, the two non-mounting vertical side faces of the corner piece can instead be, for example, at least in part cylindrical or exhibit some other curved profile. If the handrail is not to have a natural wood finish but instead be provided with a layer of veneer or thick lacquer, the terminal edge of such layer because received within the mounting pocket 30.1 or 30.2 is protected against splintering, chipping, and peeling off at exactly those locations where the layer of veneer or lacquer would be most vulnerable to such problems. If e.g. brass or bronze is desired for a particular stylistic effect, then corner pieces of essentially the same configurations as those made of wood may be employed, and can likewise be readily fabricated and installed.

In many instances, the user may feel that a single fastening screw per handrail interval end face will be insufficient, either because unconvincing in appearance, or else because actually problematic regarding strength and stability. The latter may be the case, in particular, if the material of the handrail core is not of sufficient density and/or mechanical integrity to establish a firm hold using only one fastening screw. To compensate for such problems by installing threaded bushings or the like at the construction site itself would be a relatively costly solution.

Figure 5:
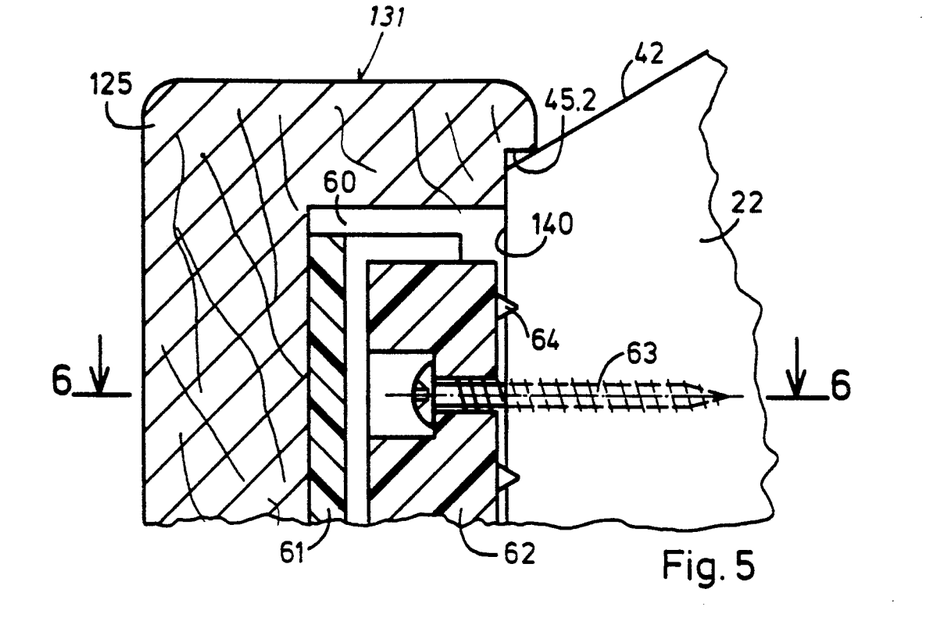
FIG. 5 is a view, partly in vertical section, depicting a corner piece, the end of one handrail interval mounted and secured thereto, and of the intermediate fastening elements used to secure the such end to corner piece.
Figure 6:
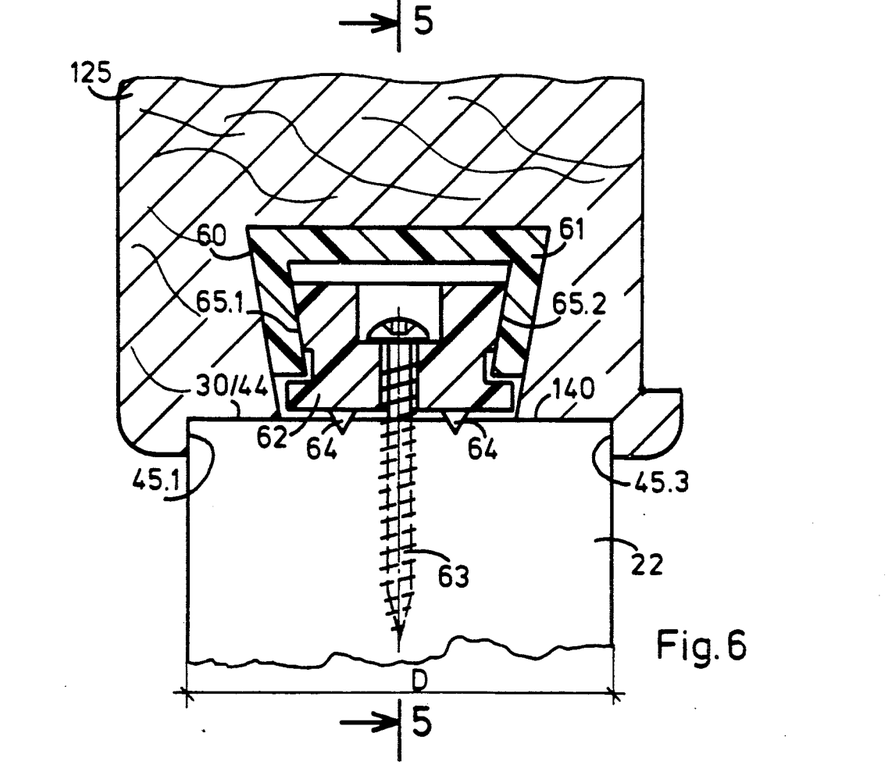
FIG. 6 is a horizontal section taken along line 6—6 of FIG. 5.

The schematically depicted embodiment of FIGS. 5-6 accordingly provides a simpler solution to such a situation. The major surface 44 of the mounting pocket 30 is provided with a vertical slot 60 of dovetail cross section having internal flanks of comparatively small inclination but being of considerable depth, measured horizontally. A vertically extending channel member 61 made of metal or plastic and of dovetail cross section is inserted into the dovetail slot 60 and is held in place therein by (not shown) screws, by means of glue or cement, or merely because its outer profile is sufficiently complementary to the dovetail slot 60 to establish a tight fit. A vertically extending, wedge-like draw bar 62 is attached to the end face 140 of handrail interval 22 by means of a single fastening screw 63, after having been cut, on site, to a length corresponding to the vertical dimension of end face 140. Draw bar 62 is provided with spike-like projections 64 which penetrate into the end face 140 of the handrail interval 22, whether the latter be wood or made of some other material, to secure the handrail interval against any tendency to rotate under load. Draw bar 62 has flaring lateral clamping faces 65.1 and 65.2 exhibiting the same inclination as the internal side walls of dovetail channel member 61. The dovetail channel member 61 is open at its lower end. Accordingly, after draw bar 62 has been fastened to handrail end face 140 the corner piece 125, prefabricated to include the dovetail channel member 61, can be slid down into engagement with draw bar 62, in the manner shown in FIG. 6, by using a hammer to pound the corner piece 125 down into place. The pulling or clamping action of draw bar 62 will cause the handrail end face 140 to slide into tight and firm face-to-face engagement with the major face 44 of the mounting pocket 30, the degree of the draw-bar effect being greater or less, as desired, dependent upon the configurations of the participating structural elements, and dependent upon the degree to which the single fastening screw 63 was tightened during the earlier mounting of bar 62 on handrail end face 140. Directionally oriented burling, toothing or other suitable directionally oriented surface roughening on mutually engaging faces of the channel member 61 and of the draw bar 62 can be employed to permit, in quasi-rachet-like fashion, the corner piece 125 to be pounded down into place comparatively easily, while making it comparatively difficult to pull it up out of place, whether entirely so as to result in disassembly, e.g., by vandals, or partly so as to result in looseness of the end joint.

Advantageously, the dovetail channel member 61 is fastened to the corner piece 125 at the factory whereas the draw bar 62 is fastened to the end face of the handrail interval on site and, in particular, after the amount of the length excess at the bottom of the corner piece 125 has been measured and removed. It will often be far easier to remove exactly the correct amount of such bottom excess when the corner piece is not in place on the ends of the handrail intervals, than to do so after the corner piece has been pounded down into place. This approach is particularly to be recommended if, due to provision of direction-oriented surface roughening, it is in fact difficult to pull off the corner piece. In that event, if the worker foresees no difficulty in removing the bottom excess with the corner piece fully in place, but then when trying to do so discovers that his assessment was wrong, he will be put to a certain amount of trouble to remove the corner piece at that late stage.

It will be understood that the shown dovetail channel member 61 and cooperating draw bar 62 are merely illustrative of a general principle that is being expounded in FIGS. 5 and 6, and that one can resort to any of a great variety of elements functionally equivalent to elements 61 and 62. Any of various interlocking-type connector mechanisms such as conventional in jointery can be employed. For example, the end face of the handrail interval can be provided with a vertical connector member having hook-like projections, and the mounting pocket can be provided with a holding plate or bar having engagement openings with which the hook-like projections interlock. In any event it is advantageous that, of a pair of such interlocking connector elements, respectively provided in the mounting pocket and on the handrail interval end face, at least one of such pair of connector elements has projecting portions, whether hook-like or of some entirely different projecting configuration. If only one of the two interlocking connector elements has such projecting portions, then it is preferable that it be provided on the handrail end face, recessed into the end face although not so far that the projecting portions cease to project. In this way, the projections-receiving connector element provided in the mounting recess can often have a configuration not requiring that the mounting recesses have a depth greater than otherwise required for its chief functions. Such comments apply especially to corner pieces made of wood.

If no particular value is seen in the use of wood in certain applications, the corner pieces can be cast or molded bodies made of metal or plastic. These can be cast or molded with recesses, namely recesses in the already recessed major surfaces of the mounting pockets, that can accommodate longitudinally extending conventional interlocking-type connector elements such as referred to above.

Depending upon the material of the corner pieces and of the handrail intervals, the corner pieces may be formed with an integral connector element, cooperating in interlocking fashion with a connector element fastened to the handrail interval, or vice versa; or where possible, both the corner pieces and the handrail intervals may be configured to include interlocking connector elements especially, for example, if both the corner pieces and the handrails were to be made of metal. In that event, relatively small dimensions for the integral connector elements would often suffice to generate and withstand relatively great clamping and holding forces between them. However, it can be more advantageous to provide a certain degree of elasticity in the connection, in order to take into account dimensional variations within the existing tolerance range, to establish an optimum clamping or draw connection, and furthermore in order to make it not impossible to overcome the action of whatever means are used to make difficult the upward removal of a fully positioned corner piece, for the event that such removal is actually required. To this end, pairs of interlocking connector elements made of plastic can be used. These can be advantageous by continuing to be useful in the event of substantial shrinkage and/or dimensional alteration of the wood employed.

Employing various ones of the concepts and principles set forth above, and further ones set out in connection with the description of the Figures, one now has available for use a quick-assembly handrail construction in which corner joints of neat and workmanlike appearance are in effect guaranteed. This can be particularly advantageous in conjunction with quickmountable balusters of the type that are secured upright on the steps of a staircase and are provided with means for adjustment of their heights. Such balusters often have at their upper ends an articulated member with a mounting flange which, advantageously, is secured to the underface of the handrail by at least one screw per baluster. Suitable articulated connection for the upper ends of the balusters represents a further area in which many different approaches have been tried but have proved to be too costly or often unsatisfactory independent of cost. In particular, in situations where it is intended to do fitting work which takes into account the actual disposition of structural members and surfaces that are present at the installation site, some way must be provided to permit unsuccessful attempts at fitting to be re-done. Re-doing of already done work can be extraordinarily difficult when fastening screws have been used in doing the work. If the locations of some or all of the already tightened fastening screws must be changed, the old or abandoned screw holes are sometimes unacceptably conspicuous. Also, it can be difficult to achieve correct directional orientation and lateral centering of the handrail intervals by means of work performed at their underfaces.

The invention seeks to improve upon this problematic situation, even in cases where one does not use the already described construction system employing the inventive corner pieces. In accordance with a particular concept of the invention, the handrail intervals are each provided at their underfaces with a longitudinally extending slot. The articulated connectors at the top ends of the balusters are provided with flanges and with screws that pass through the flanges and are screwed into such slot. Importantly, such screws can be screwed into such slot anywhere along the length thereof. Thus, the screwholes in the handrail do not begin sooner than at the innermost face of the longitudinal slot, and repositioning of fastened screws can be performed uninhibitedly with the knowledge that the abandoned screwholes will be scarcely visible, if at all. The slot is a feature of the handrail exhibiting a regular geometry and its breadth can often be so selected relative to the transverse thickness and cross-sectional configuration of the handrail that the slot appears as a part, even an aesthetically pleasing part, of the handrail design. Further good use of such slot can be made, by providing the flanged articulate connector at the top end of each baluster with a longish tab located, for example, on the top face of the flange, the tab being received with a quite firm but not excessively tight fit within the slot. With the additional support and stability provided by the engagement of such longish tabs in the underface slot, it will very often suffice to secure the articulate connector to the handrail underface using only one fastening screw per connector, to tighten the connector's flange against the underface. Indeed, when the flange tab is rather tightly inserted into the slot, and with the top face of the flange in frictional engagement with the underface of the handrail interval, motion of the flange of the articulate connector along the length of the slot is resisted to a fair degree, but not precluded, and this can be very useful. In particular, it facilitates provisional set-up of the balusters, handrail intervals, and corner pieces, permitting repeated readjustments before one commits oneself to the act of severing the ends of the handrail intervals to form their end faces and cutting off the bottom excess of the connector pieces. I.e., all this provisional set-up can be done without using fastening screws to penetrate the bottom of the handrail intervals. The fastening screws for the flanges need not be activated until the set-up is entirely satisfactory.

Figure 7:
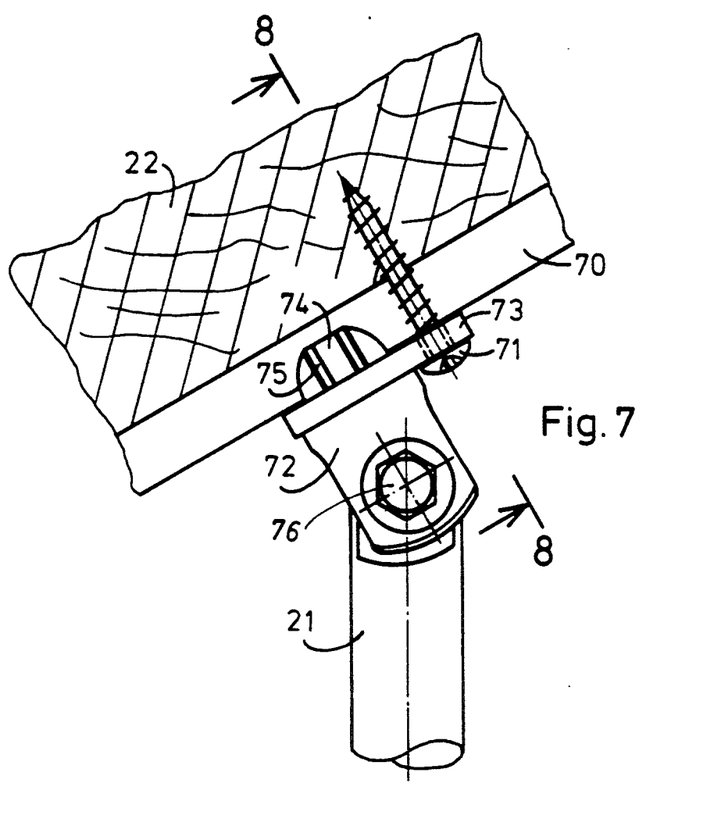
FIG. 7 is a vertical section through a portion of an inclined handrail interval and the upper end of a baluster articulately secured to the underface of the handrail interval.
Figure 8:
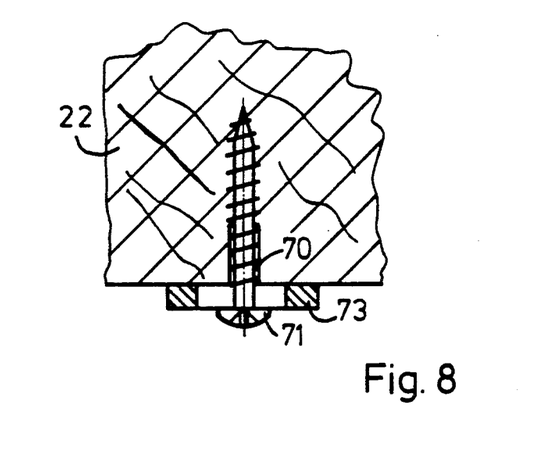
FIG. 8 is a section taken along line 8—8 of FIG. 7.

FIGS. 7 and 8 concern, and depict in greater detail than in FIG. 2, the longitudinal slot 70 that the handrail interval 22 may have at its underface, this slot having a small transverse breath of about 4 mm and a depth of about 8 mm. As shown most clearly in FIG. 8, slot 70 accommodates the fastening screws 71 of articulated members 72. Each articulated member 72 has a flange 73 through which the respective screw 71 extends, preferably through a transversely extending, elongated slot in flange 73 such as shown (without reference numeral) in FIG. 8. Flange 73 has at its upper side a longish tab 74, which fits into the slot 70 with a considerable but not extreme degree of tightness and which for example can furthermore have holding ribs 75. Each baluster 21 is attached to the respective articulated member 72 by means of a respective mounting bolt 76 at any required degree of angular inclination. The handrail intervals must be mounted to fit into and be fastened to the corner pieces with a certain degree of exactness. Accordingly, it can happen that, after all the screws 71 have been secured in order to mount a handrail interval on its balusters 21, it is discovered that this work was not exactly enough performed. If that occurs, one can loosen the screws 71 and displace the articulated members 72 in and along the slot 70, and then unproblematically screw the fastening screws 71 back into the underface of the handrail interval 22 at new and better locations, even locations which directly adjoin the old or abandoned screwholes, and if necessary screw some of screws 71 back in with a certain degree of slant relative to the underface of the handrail interval. The fact that such a correction in the mounting of the handrail interval on its balusters has been performed will not be perceptible.

As already noted, the balusters 21 and their articulated members 72 are connected by the tabs 74 of the latter to the handrail interval underface with a considerable degree of firmness, and such a mechanism for securing a handrail interval to associated balusters can also be employed in the case of balustrades designed to have other types of corner connections between successive handrail intervals, i.e., connections that do not include the corner pieces such as described hereinabove.

While the invention has been illustrated and described as embodied in corner modules and articulate connectors for balustrade handrail constructions, constructions incorporating the same, and methods for partial factory pre-fabrication and for on-site fabrication and installation of the same, it is not intended to be limited to the details shown, since various modifications and structural and procedural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of making a handrail construction for a staircase balustrade, wherein the handrail construction is to include:
a plurality of straight-extending handrail intervals having elongation directions and uniform cross sections as considered in sectioning planes normal to the elongation directions, the uniform cross sections of the handrail intervals being identical, and wherein various ones of the handrail intervals are to exhibit differing respective angles of inclination to the horizontal, a plurality of corner modules each of which is to join together at least a first and a second handrail interval to form a handrail, each handrail interval having two ends and at each end an end surface, each end surface being of a respective vertical dimension corresponding to the angle of inclination which the respective handrail interval is to exhibit, the method comprising:

(a) from handrail stock forming a discrete handrail intervals including first and second handrail intervals having end surfaces, each end surface being of a respective vertical dimension corresponding to the angle of inclination which the respective handrail interval is to exhibit, with the end surfaces having top and side edge potions, (b) providing a plurality of corner modules, at least some of which are formed having at least first and second side surface portions constituting first and second mounting surface portions, the first and second mounting surface portions having respective first and second recessed mounting pockets for the end surfaces of respective first and second handrail intervals that are to be joined together to form a handrail corner, (b1) including forming each such recessed mounting pocket with a recessed major surface bounded by non-recessed top and lateral boundary edge portions, (b2) with the top and lateral boundary edge portions of the mounting pockets being formed by parts of the first and second mounting surface portions that are not recessed in the way that the major surfaces of the mounting pockets are recessed, mounting pockets are recessed, (b3) there being no such non-recessed bottom boundary edge portion for the recessed mounting pocket, the recessed mounting pocket accordingly being formed open at its bottom end, (c) positioning a first and a second handrail interval in the positions relative to each other that they are to occupy in the handrail construction, (d) pushing down the corner module from above into position on the ends of the first and second handrail intervals, in such a manner that:

(d1) the first and second recessed mounting pockets, by virtue of their open bottom ends, increasingly accept and accommodate the ends of these handrail intervals, with the end surfaces of the first and second handrail intervals each coming into surface-to-surface contact with the recessed major surface of a respective one of the first and second recessed mounting pockets, thereby becoming braced against the recessed major surface of the respective recessed mounting pocket, and (d2) after the corner module has been fully pushed down into position, the non-recessed top and lateral boundary edge portions of each recessed mounting pocket cover and hide top-edge and side-edge imperfections located at the top and side edges of the end surface of the respective handrail interval, (e) and employing in the above step (d) a corner module whose recessed mounting pockets initially have heights greater than the vertical dimensions of the end surfaces of the respective first and second handrail intervals, (e1) thereby assuring that the corner module can cover and hide such top-edge and side-edge imperfections no matter how great the angle of inclination of a particular handrail interval and, accordingly, no matter how correspondingly great the vertical dimension of the end surface of such handrail interval, (e2) any resulting vertical excess of the material of the corner module at the bottom end thereof being capable of being severed off.

2. The method as defined in claim 1, after the step recited above at (d) of pushing the corner module down into position on the ends of the first and second handrail intervals severing off any resulting vertical excess of the material of the corner module at the bottom end thereof.

3. The method as defined in claim 1,
furthermore including the step of utilizing fastening means to securely fasten the ends of the first and second handrail intervals to the respective corner module.

4. The method as defined in claim 3, after said step of utilizing fastening means to securely fasten the ends of the first and second handrail intervals to the respective corner module severing off any vertical excess of the material of the corner module at the bottom end thereof.

5. The method as defined in claim 3,
wherein the utilized fastening means comprise first connector elements on the corner modules and second connector elements on the ends of handrail intervals to be fastened to the corner modules,
the first and second connector elements being interlocking connector elements respectively so configured that, as corner modules are pushed down from above into position on the ends of associated handrail intervals, the associated first and second connector elements together establish a self-tightening, interlocking connection between corner modules and the ends of associated handrail intervals.

6. The method as defined in claim 5,
wherein the utilized first connector elements are discrete elements located and secured within respective recessed mounting pockets of respective corner modules, and
wherein the utilized second connector elements are discrete elements located at the end surfaces of respective handrail intervals.

7. The method as defined in claim 5,
wherein the major surface of a recessed mounting pocket constitutes a first surface and the end surface of the handrail interval to be accommodated in that mounting pocket constitutes a second surface,
forming a recess in one of said first and second surfaces and providing one of said first and second connector elements in such recess.

8. The method as defined in claim 7, wherein said first connector element is provided within a recess formed in said first surface.

9. The method as defined in claim 8, securing said second connector element, non-recessed, on said second surface.

10. The method as defined in claim 5, wherein, of said first and second connector elements, one thereof is configured to have an undercut recess which extends generally vertically and the other thereof is configured to have diverging portions which are accommodated in said undercut recess, the undercut recess of said one connector element and the diverging of said other connector element being shaped such that, when the corner module is pushed down from above into position on the end of an associated handrail interval, the first and second connector elements interlock and tend to draw the major surface of the respective recessed mounting pocket and the end surface of the respective handrail interval towards each other.

11. The method as defined in claim 5,
wherein the major surface of a recessed mounting pocket constitutes a first surface and the end surface of the handrail interval to be accommodated in that mounting pocket constitutes a second surface, providing at least one of said first and second connector elements with a plurality of penetrative portions,
said penetrative portions of said one connector element penetrating into the material of the associated one of said first and second surfaces, to resist any loads that tend to effect relative rotation between said one connector element and the associated one of said first and second surfaces.

12. The method as defined in claim 11, fastening said one connector element to the associated one of said first and second surfaces utilizing a fastening screw.

13. The method as defined in claim 12, wherein said one connector element is fastened to the associated one of said first and second surfaces by means of only a single fastening screw, the inability of a single fastening screw to strongly resists loads tending to effect relative rotation between second one connector element and the associated surface being compensated by the presence and action of said plurality of penetrative portions.

14. The method as defined in claim 5, wherein, of said first and second connector elements, at least one thereof is made of molded synthetic plastic.

15. The method as defined in claim 5, wherein of said first and second connector elements, at least one thereof is made of metal.

16. The method as defined in claim 5,
wherein the major surface of the recessed mounting pocket of a corner module is provided with a connector-receiving recess which accommodates a respective first connector element,
the connector-receiving recess and the respective first connector element being so shaped that the latter is accommodated in the former in interlocking manner.

17. The method as defined in claim 16, said connector-receiving recess being so shaped as an undercut recess and the respective first connector element being shaped to have diverting portions which are accommodated in said undercut recess.

18. The method as defined in claim 16, the corner modules being molded one-piece items that are molded to have said recessed mounting pockets and said connector-receiving recesses.

19. The method as defined in claim 5, the corner modules being molded items formed of one piece with respective ones of said first connector elements.

20. The method as defined in claim 1,
wherein step (c) of claim 1 includes:
(c1) erecting a plurality of balusters in the positions they will occupy in the completed handrail,
(c2) connecting to the top ends of the balusters respective articulate baluster-connecting members having slot-engaging projections,
(c3) forming in the bottom surface of the first and second handrail intervals longitudinally extending slots dimensioned to be able receive the slot-engaging projections in such a manner that the latter are firmly received but slidable along the lengths of the slots.

21. The method as defined in claim 20,
wherein step (c) furthermore includes:
(c4) at least temporarily attaching the handrail intervals to the articulate baluster connecting members with the slot-engaging projections of the latter received in the slots of respective handrail intervals, and
(c5) to the extent necessarily longitudinally shifting the handrail intervals until they assume the positions relative to each other that they are to occupy in the completed handrail.

22. The method as defined in claim 21,
wherein step (c20 includes utilizing articulate baluster-connecting members which furthermore are provided with mounting flanges located to bear against the bottom surface of a handrail interval,
wherein step (c4) includes using fastening screws to attach the articulate baluster-connecting members to the handrail intervals, this including screwing the articulate baluster connecting members to the bottom surfaces of the handrail intervals in such a manner that the mounting flanges are pressed against the bottom surfaces of the handrail intervals and the fastening screws enter into the material of the handrail intervals at locations deep inside the slots of the bottom surfaces of the handrail intervals.
wherein step (c5) includes unscrewing the fastening screws of any wrongly positioned handrail interval, thereby releasing any pressing force exerted by the mounting flanges upon the bottom surfaces of the handrail intervals without the slot-engaging portions of the baluster-connecting members exiting the longitudinal slots, then to the extent necessary longitudinally shifting the wrongly positioned handrail interval until it assumes the relive position it is to occupy in the completed handrail, and then again using the fastening screws to fasten the articulate baluster connecting members to the bottom surfaces of the handrail intervals,
whereby, if during handrail attaching work any already fastened handrail intervals need to be unfastened, repositioned, and then re-fastened in a manner requiring new and different locations for the fastening screws, the old or abandoned screwholes will not be readily visible, even if viewed somewhat from below, because they are hidden deep within the interiors of said slots.

23. The method as defined in claim 1,
wherein step (c) comprises:
forming in the bottom surface of the first and second handrail intervals longitudinally extending slots,
arranging a plurality of balusters in the positions they will occupy in the handrail construction,
connecting to the top ends of the balusters respective articulate baluster-connecting members and using fastening screws to attach the articulate baluster-connecting members to the handrail intervals in such a manner that the fastening screws enter the material of the handrail intervals at locations deep inside the slots of the bottom surfaces of the handrail intervals, whereby, if during handrail attaching work any already fastened handrail intervals need to be unfastened, repositioned, and then re-fastened in a manner requiring new and different locations for the fastening screws, the old or abandoned screwholes will not be readily visible, even if viewed somewhat from below, because they are hidden deep within the interiors of said slots.

24. The method as defined in claim 23,
using as the employed articularly connectable baluster-connecting members articulately connectable baluster-connecting members which are provided with mounting flanges located to bear against the bottom surface of a handrail interval, the using of fastening screws to attach the articulate baluster-connecting members to the handrail intervals comprising screwing the articulate baluster-connecting members to the bottom surfaces of the handrail intervals in a manner pressing the mounting flanges against the bottom surfaces of the handrail intervals.

25. The method as defined in claim 1,
using corner modules that are of generally columnar shape, with said first and second mounting surface portions being planar and vertical.

26. The method as defined in claim 25,
using corner modules which have a further side surface portion that is planar and vertical, does not have a recessed mounting pocket and constitutes a first non-mounting side surface portion.

27. The method as defined in claim 25,
using corner modules each having two further side surface portions which are planar and vertical, doe not have recessed mounting pockets, and constitute first and second non-mounting side surface portions, the planar and vertical first and second non-mounting side surface portions together with the planar and vertical first and second mounting surface portions forming the four side faces of a columnar element having a rectangular cross section.

28. The method as defined in claim 27,
each recessed mounting pocket being formed to have an outline which is defined by the associated top and lateral boundary edge portions and which is generally rectangular,
the two lateral boundary edge portions associated with a respective recessed mounting pocket being formed to include a broader and a narrower lateral boundary edge portion having different respective horizontally measured breadths.

29. The method as defined in claim 28,
the two lateral boundary edge portions of each recessed mounting pocket being formed to include:
a first lateral boundary edge portion located to withstand transverse loads exerted in a direction associated with the possibility of the balustrade collapsing in a first direction of collapse, and
a second lateral boundary edge portion located to withstand transverse loads exerted in a direction associated with the possibility of the balustrade collapsing in an opposite second direction of collapse, one of said first and second directions of collapse being the direction of inward balustrade collapse,
the other of said first and second directions of collapse being the direction of inward balustrade collapse,
the first lateral boundary edge portion of the first recessed mounting pocket and the first lateral boundary edge portion of the second recessed mounting pocket being the narrower lateral boundary edge portions of the recessed mounting pockets,
the second lateral boundary edge portion of the first recessed mounting pocket and the second lateral boundary edge portion of the second recessed mounting pocket being the narrower lateral boundary edge portions of the recessed mounting pockets.

30. The method as defined in claim 25,
using corner modules each having two further side surface portions which are planar and vertical, doe not have recessed mounting pockets, and constitute first and second non-mounting side surface portions, the planar and vertical first and second non-mounting side surface portions together with the planar and vertical first and second mounting surface portions forming four side faces of a columnar element having a rectangular cross section, the first and second non-mounting side surface portions together including a right angle, the first and second mounting surfaces portions together including a right angle.

31. The method as defined in claim 30,
the first and second non-mounting side surface portions adjoining each other at a vertically extending corner region,
and forming the corner region as a vertically extending rounded corner region.

32. The method as defined in claim 30, utilizing a corner module formed to have a top surface which is planar and horizontal.

33. The method as defined in claim 25, utilizing a corner module so formed that its planar and vertical first and second mounting surface portions together include a right angle.

34. The method as defined in claim 1, utilizing a corner module so formed that the major surfaces of the mounting pockets are planar, vertical and perpendicular to each other.

35. The method as defined in claim 1, utilizing a corner module so formed that the top and lateral boundary edge portions of each recessed mounting pocket are planar and vertical and occupy a single respective plane.

36. The method as defined in claim 1, utilizing a corner module so formed that each recessed mounting pocket is of generally rectangular outline.

37. The method as defined in claim 1, forming each corner module as a one-piece member.

38. The method as defined in claim 1, the corner modules being molded one-piece items that are molded to have said recessed mounting pockets.

39. The method as defined in claim 1, the corner modules being made of wood with machined recessed mounting pockets.

40. The method as defined in claim 39, the grain of the wood being oriented generally vertical.

* * * * *